(12) United States Patent
Herrig et al.

(10) Patent No.: US 12,104,571 B2
(45) Date of Patent: Oct. 1, 2024

(54) ROTOR BLADE ASSEMBLY FOR MITIGATING STALL-INDUCED VIBRATIONS

(71) Applicant: LM WP PATENT HOLDING A/S, Kolding (DK)

(72) Inventors: Andreas Herrig, Salzbergen (DE); Martin Stettner, Salzbergen (DE); Benjamin Patrick Hallissy, Schenectady, NY (US)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/014,400

(22) PCT Filed: Jun. 29, 2021

(86) PCT No.: PCT/EP2021/067888
§ 371 (c)(1),
(2) Date: Jan. 4, 2023

(87) PCT Pub. No.: WO2022/008302
PCT Pub. Date: Jan. 13, 2022

(65) Prior Publication Data
US 2023/0287863 A1    Sep. 14, 2023

(30) Foreign Application Priority Data
Jul. 7, 2020    (GB) .................................... 2010416

(51) Int. Cl.
*F03D 1/06* (2006.01)
(52) U.S. Cl.
CPC ...... *F03D 1/0675* (2013.01); *F05B 2240/303* (2020.08); *F05B 2240/3052* (2020.08); *F05B 2240/3062* (2020.08)

(58) Field of Classification Search
CPC ................. F03D 1/0675; F03D 1/0633; F05B 2240/3062; F05B 2240/303; F05B 2240/3052
See application file for complete search history.

(56) References Cited

U.S. PATENT DOCUMENTS 6,318,677 B1    11/2001    Dixon
6,382,561 B1    5/2002    Brink
(Continued)

FOREIGN PATENT DOCUMENTS

EP    0954701 B1    5/2001
EP    2362091 A1    8/2011
(Continued)

OTHER PUBLICATIONS

PCT International Search Report & Opinion Corresponding to PCT/EP2021/067888 on Sep. 30, 2021.
(Continued)

*Primary Examiner* — David E Sosnowski
*Assistant Examiner* — Maxime M Adjagbe
(74) *Attorney, Agent, or Firm* — Dority & Manning, P.A.

(57) ABSTRACT

A rotor blade assembly for mitigating stall-induced vibrations of a wind turbine during standstill includes at least one protrusion secured to the leading-edge of a rotor blade and defining an extended leading edge. The protrusion(s) wraps around a portion of the rotor blade from the suction side to the pressure side of the rotor blade. The protrusion(s) has a root-side face and a tip-side face disposed opposite thereof. The root-side face is arranged at an angle relative to a chordwise reference line. The angle is greater than zero degrees and less than or equal to 45 degrees with respect to the chordwise reference line. The protrusion(s) is configured to affect a chordwise airflow and thereby mitigate a stall-induced vibration.

18 Claims, 10 Drawing Sheets

(56) References Cited

U.S. PATENT DOCUMENTS

| | | | |
|---|---|---|---|
| 6,431,498 | B1 | 8/2002 | Watts et al. |
| 6,672,837 | B1 | 1/2004 | Veldkamp et al. |
| 7,204,674 | B2* | 4/2007 | Wobben ................ F03D 1/0641 416/41 |
| 7,740,206 | B2 | 6/2010 | Eaton et al. |
| 7,837,439 | B2 | 11/2010 | Bech |
| 7,988,416 | B2 | 8/2011 | Westergaard |
| 7,988,421 | B2 | 8/2011 | Bakhuis et al. |
| 8,011,886 | B2* | 9/2011 | Subramanian ............ F03D 1/06 416/23 |
| 8,038,396 | B2 | 10/2011 | Anjuri et al. |
| 8,192,161 | B2 | 6/2012 | Baker et al. |
| 8,210,469 | B2 | 7/2012 | Nitzsche et al. |
| 8,267,654 | B2 | 9/2012 | van Dam et al. |
| 8,657,561 | B2 | 2/2014 | Buffone et al. |
| 8,749,084 | B2 | 6/2014 | Gjerlov et al. |
| 9,261,080 | B2 | 2/2016 | Ededal et al. |
| 9,316,202 | B2 | 4/2016 | Bech |
| 9,945,352 | B2* | 4/2018 | Kumar ................ F03D 1/0641 |
| 10,041,470 | B2 | 8/2018 | Ramachandran et al. |
| 10,144,499 | B2* | 12/2018 | Shepshelovich .......... B64C 3/14 |
| 10,507,906 | B2* | 12/2019 | Whalen ................ B64C 3/14 |
| 2008/0061192 | A1 | 3/2008 | Sullivan |
| 2011/0164975 | A1 | 7/2011 | Vyas |
| 2012/0251318 | A1 | 10/2012 | Caso Prieto et al. |
| 2013/0045105 | A1* | 2/2013 | Driver ................ F03D 1/0675 29/889.7 |
| 2013/0224037 | A1 | 8/2013 | Simpson et al. |
| 2013/0255796 | A1 | 10/2013 | Dimascio et al. |
| 2014/0050580 | A1 | 2/2014 | Hagen et al. |
| 2016/0272301 | A1* | 9/2016 | Shmilovich ............ B64C 21/08 |
| 2016/0305403 | A1 | 10/2016 | Zheng et al. |
| 2016/0369770 | A1 | 12/2016 | Vuillaume et al. |
| 2017/0002797 | A1 | 1/2017 | Chen et al. |
| 2019/0078558 | A1* | 3/2019 | Enevoldsen ............ F03D 80/40 |
| 2019/0195202 | A1* | 6/2019 | Kirkegaard ........... B29C 66/326 |
| 2019/0383262 | A1* | 12/2019 | Van Kalken .......... F03D 1/0675 |
| 2021/0079896 | A1 | 3/2021 | Herrig et al. |

FOREIGN PATENT DOCUMENTS

| | | |
|---|---|---|
| EP | 2577050 B1 | 4/2015 |
| WO | WO02084114 A1 | 10/2002 |
| WO | WO2014022910 A1 | 2/2014 |
| WO | WO2015053768 A1 | 4/2015 |

OTHER PUBLICATIONS

Hansen et al., Reduction of Flow Induced Airfoil Tonal Noise Using Leading Edge Sinusoidal Modifications, Acoustics Australia, vol. 40, No. 3, Dec. 2012, pp. 172-177. http://www.acoustics.asn.au/journal/2012/2012_40_3_Hansen.pdf.

Narayanan et al., Airfoil Noise Reductions through Leading Edge Serrations, Physics of Fluids, vol. 27, Issue 2, 2015, 35 Pages. http://eprints.soton.ac.uk/374405/1/Preprint-PoF-2015.pdf.

Oerlemans et al., Low-Noise Wind Turbine Design, Siemens Wind Power A/S, 2012, 23 Pages. http://www.ewea.org/events/workshops/wp-content/uploads/2012/12/EWEA-Noise-Workshop-Oxford-2012-2-2-Stefan-Oerlemans.pdf.

Soderman et al., Aerodynamic Effects of Leading-Edge Serrations on a Two Dimensional Airfoil, Nasa Technical Memorandum, NASA TM X-2643, Sep. 1972, 38 Pages. http://ntrs.nasa.gov/archive/nasa/casi.ntrs.nasa.gov/19720023342.pdf.

* cited by examiner

ROTOR BLADE ASSEMBLY FOR MITIGATING STALL-INDUCED VIBRATIONS

RELATED APPLICATIONS

The present application claims priority to PCT Application Number PCT/EP2021/067888, filed on Jun. 29, 2021, which claims priority to GB 2010416.2, filed Jul. 7, 2020. Both applications are incorporated by reference herein

FIELD

The present disclosure relates in general to wind turbines, and more particularly to rotor blade assemblies for mitigating stall-induced vibrations on a wind turbine during standstill.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During the lifespan of the wind turbine, there may, from time to time, be periods where the rotor blades are parked or idled. For example, the wind turbine is generally locked in a fixed position during installation or repair of the rotor blades. In another instance, the rotor blades may be pitched so as to idle the wind turbine during a maintenance procedure. Often, during such maintenance or installation procedures, or in response to a system failure, the ability to pitch the rotor blades or yaw the nacelle relative to the wind may be lost. Thus, when modern wind turbines are parked or idled, they are put at risk for flow-induced oscillations caused by the wind.

In one instance, the flow-induced oscillations may be the result of the wind impacting the rotor blade at such an angle of attack as results in the rotor blade being in a stalled condition and/or the wind having a spanwise flow component. When impacting the rotor blade in such a manner, the wind may form vortices at locations where the flow separates from the rotor blade. Depending on the relative angle between the wind and the rotor blade, and the motion of the rotor blade, a phenomenon may occur wherein the flow detaches from and re-attaches to the rotor blade, potentially adding energy to the wind turbine system. Such variation in load may result in stall-induced vibrations which coincide with, or are sufficiently close to, a natural frequency of the structure so that large and damaging vibrations may result.

A known method for counteracting such stall-induced vibrations is to feather the rotor blade with respect to the wind so that the wind flows smoothly around the rotor blade. However, without the ability to adjust the position of the rotor blade, additional approaches may be required to counteract the stall-induced vibrations.

In view of the aforementioned issues, the art is continuously seeking new and improved systems and methods for mitigating stall-induced vibrations. Thus, the present disclosure is directed to a rotor blade assembly for mitigating stall-induced vibrations on a wind turbine during standstill.

BRIEF DESCRIPTION

Aspects and advantages of the invention will be set forth in part in the following description, or may be obvious from the description, or may be learned through practice of the invention.

In one aspect, the present disclosure is directed to a rotor blade assembly of a wind turbine. The rotor blade assembly may include a rotor blade defining a body extending between a root and a tip and having surfaces defining a suction side, a pressure side, a leading edge, and a trailing edge. The rotor blade may also define a chordwise reference line extending between the leading edge and the trailing edge. Additionally, the rotor blade assembly may include at least one protrusion secured at the leading edge or the trailing edge of the rotor blade defining an extended leading edge. The protrusion(s) may also wrap around a portion of the rotor blade from the suction side to the pressure side. Further, the protrusion(s) may have a root-side face and a tip-side face disposed opposite thereof. The root-side face may be arranged at an angle relative to the chordwise reference line. The angle may be greater than zero degrees and less than or equal to 45 degrees with respect to the chordwise reference line. Preferably, the at least one protrusion is secured to the leading edge and defines an extended leading edge.

In an embodiment, the protrusion(s) may have a first arcuate profile and a second arcuate profile. The second arcuate profile may define a suction-side offset adjacent to the suction side of the rotor blade, a pressure-side offset adjacent to the pressure side of the rotor blade, and an intermediate offset. The intermediate offset may be greater than the pressure-side and suction-side offsets. The intermediate, pressure-side, and suction-side offsets may define a distance between the second arcuate profile and the surface of the rotor blade. In an embodiment, the first and second arcuate profiles may define a protrusion profile which has a crescent shape.

In an additional embodiment, the intermediate offset may be at least 5% of a chord of the rotor blade. The chord may be the chord of the rotor blade at a spanwise mounting position of the protrusion(s).

In a further embodiment, the protrusion may be one of a plurality of protrusions. In such embodiments, a spacing between each protrusion of the plurality of protrusions may be at least 1.5 times a chord length of the rotor blade.

In an embodiment, the plurality of protrusions may be distributed across a tip region of the rotor blade.

In an additional embodiment, the spacing between each protrusion of the plurality of protrusions may be at least three times a chord length of the rotor blade.

In a further embodiment, the protrusion(s) may define a protrusion profile the protrusion(s) may also include a profile extension extending in a spanwise direction from the protrusion profile. The profile extension may taper in a spanwise direction.

In an embodiment, the protrusion(s) has a length along the suction side of the rotor blade of at least 10% or more of the chord, such as 10% or more of the chord to 40% or less of the chord of the rotor blade.

In an additional embodiment, the protrusion(s) may be movably coupled to the rotor blade. The protrusion(s) may also include a retreated operating position and a deployed operating position. The rotor blade assembly may also include an actuating mechanism configured to transition the protrusion(s) between the normal operating position and the deployed operating position.

In a further embodiment, the actuating mechanism may include an air scoop configured to receive a portion of an airflow at an angle to the chordwise reference line. In response to receiving the portion of the airflow, the protrusion(s) may be transitioned to the deployed operating position.

In an embodiment, the protrusion(s) is pivotably coupled to the rotor blade via a pivot member. The rotor blade assembly may also include a pitstop configured to restrict a swiveling of the protrusion.

In an additional embodiment, the rotor blade assembly may also include a motivating element positioned to facilitate the transition of the protrusion(s) between a normal operating position and a stalled operating position.

In a further embodiment, the protrusion(s) may also include a plurality of vortex perforations. Each vortex perforation may have a vortex-bore access oriented perpendicular to the root-side face. The plurality of vortex perforations may generate a plurality of vortices in response to an airflow at an angle to the chordwise reference line.

In an embodiment, the protrusion(s) may also include a plurality of passage perforations. Each passage perforation of the plurality of passage perforations may have a passage-bore access oriented parallel to the chordwise reference line. The plurality of passage perforations may define a plurality of flow paths for an airflow parallel to the chordwise reference line.

In an additional embodiment, the protrusion(s) may include a flap element operably coupled thereto via a pivot element. The flap element may include a root-side flap portion disposed within a recess of the root-side face when the flap element is in a first flap position. The root-side flap portion may have a second flap position defined by a first distance between the root-side flap portion and the root-side face when the rotor blade is in a stalled condition. The flap element may also include a tip-side flap portion disposed within a recess of the tip-side face when the flap element is in the first flap position. The second flap position may be defined by a distance between the tip-side flap portion and the tip-side face when the rotor blade is in the stalled condition.

In a further embodiment, the flap element may also include a motivating element positioned to facilitate a transition of the flap element between the first and second flap positions.

In an embodiment, the protrusion(s) may also include a plurality of vortex perforations. Each vortex perforation of the plurality of vortex perforations may include a vortex-bore axis oriented perpendicular to the root-side face. The protrusion(s) may also include a plenum member coupled between the tip-side face of the protrusion(s) and the tip-side flap portion. The plenum member may be fluidly coupled to the plurality of vortex perforations when the flap element is in the second flap position.

In another aspect, the present disclosure is directed to a wind turbine. The wind turbine may include a tower, a nacelle mounted atop the tower, and a rotor mounted to the nacelle. The rotor may include a rotatable hub having a plurality of rotor blade assemblies secured thereto. Each of the rotor blade assemblies may include a rotor blade defining a body extending between a root and a tip and having surfaces defining a suction side, a pressure side, a leading edge, and a trailing edge. The rotor blade may also define a chordwise reference line extending between the leading edge and the trailing edge. Additionally, the rotor blade assembly may include at least one protrusion secured at the leading edge or the trailing edge of the rotor blade defining an extended leading edge or trailing edge. The protrusion(s) may also wrap around a portion of the rotor blade from the suction side to the pressure side. Further, the protrusion(s) may have a root-side face and a tip-side face disposed opposite thereof. The root-side face may be arranged at an angle relative to the chordwise reference line. The angle may be greater than zero degrees and less than or equal to 45 degrees with respect to the chordwise reference line.

It should be understood that the rotor blade assembly may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
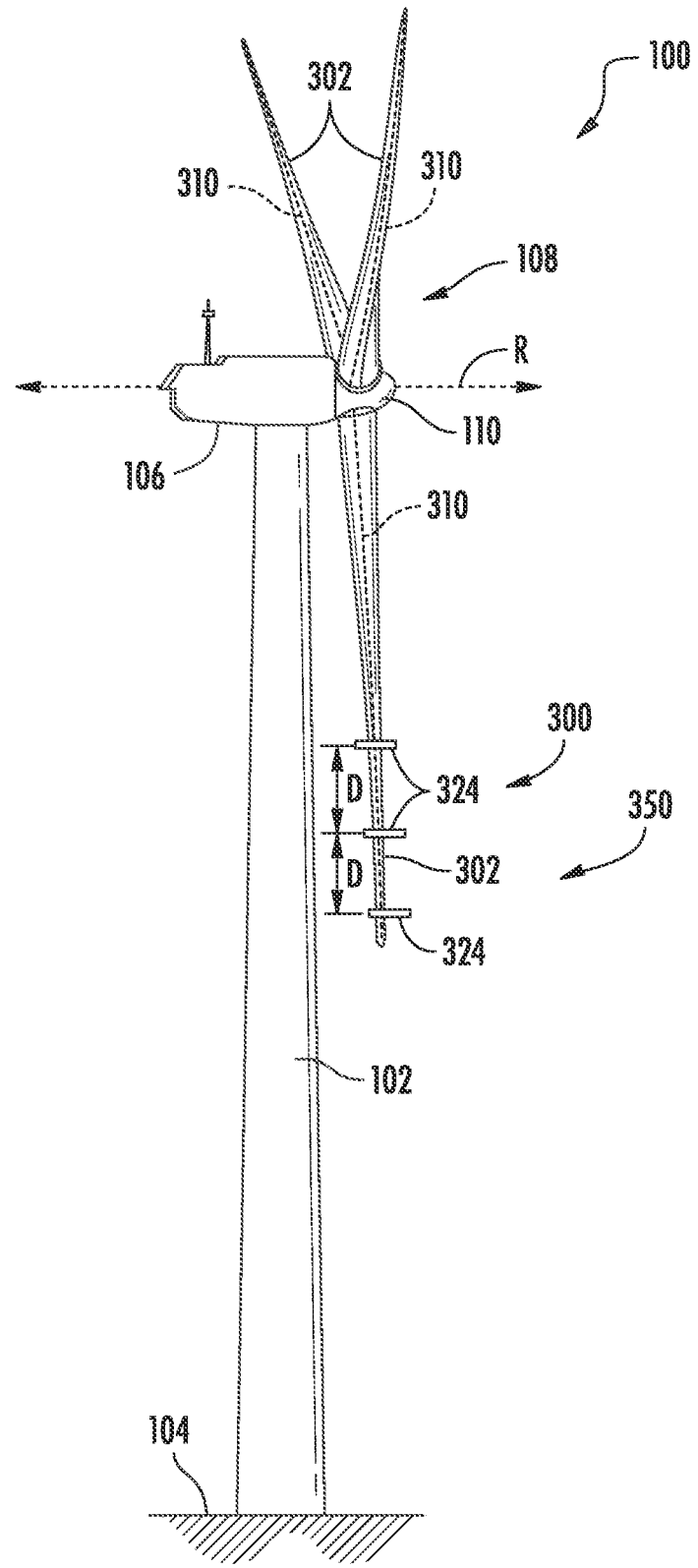
FIG. 1 illustrates a perspective view of one embodiment of a wind turbine having a rotor blade assembly for mitigating stall-induced vibrations according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a rotor blade assembly for mitigating stall-induced vibrations on a wind turbine at standstill. The rotor blade assembly may include at least one protrusion secured to the leading edge of a rotor blade and extending from the suction side to the pressure side of the rotor blade. The protrusion(s) may be positioned at an angle which minimizes drag when the wind turbine is in normal operations, while maximizing the effects of the protrusion(s) on a crosswise airflow when the rotor blade is in a stalled condition. The protrusion(s) may affect the crosswise airflow by disrupting a vortex shedding phenomenon resulting from the stalled condition of the rotor blade.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade assembly (assembly) 300 coupled to and extending outwardly from the hub 110. The assembly 300 may include a rotor blade(s) 302. For example, in the illustrated embodiment, the rotor 108 includes three rotor blades 302. However, in an alternative embodiment, the rotor 108 may include more or less than three rotor blades 302. Each rotor blade(s) 302 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator positioned within the nacelle 106 to permit electrical energy to be produced.

Figure 2:
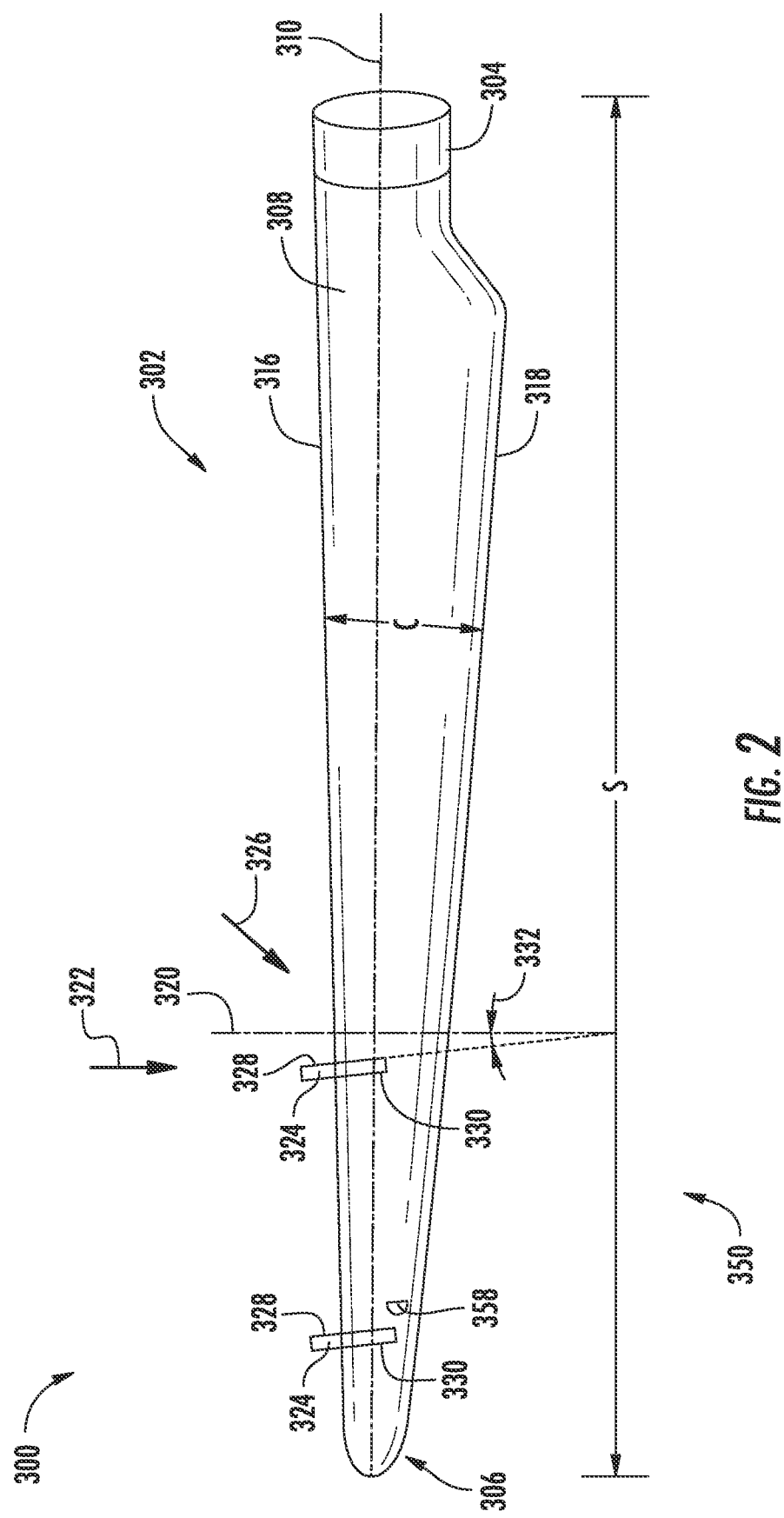
FIG. 2 illustrates a perspective view of the rotor blade assembly of FIG. 1 according to the present disclosure.

Referring now to FIG. 2, a perspective view of the assembly 300 of the wind turbine 100 shown in FIG. 1 is illustrated. The rotor blade(s) 302 of the assembly 300 may generally include a blade root 304 configured to be mounted or otherwise secured to the hub 110 of the wind turbine 100 and a blade tip 306 disposed opposite the blade root 304. A body shell 308 of the rotor blade(s) 302 may generally extend between the blade root 304 and the blade tip 306 along a pitch axis 310. The body shell 308 may generally serve as the outer casing or surface or covering of the rotor blade(s) 302. The body shell 308 may define a substantially aerodynamic profile such as by defining a symmetrical or cambered airfoil-shaped cross-section. The body shell 308 may also define a pressure side 312 and a suction side 314 extending between a leading edge 316 and a trailing edge 318 of the rotor blade(s) 302.

In an embodiment, the rotor blade(s) 302 may also have a span (S), which defines the total length between the blade root 304 and the blade tip 306. The rotor blade(s) 302 may also have a chord (C) defining the length between the leading edge 316 and the trailing edge 318 at a specified spanwise location. The chord (C) may be oriented parallel to an axis of rotation (R) of the rotor 108. As is generally understood, the chord (C) may vary in length with respect to the span (S) as the rotor blade(s) 302 extends from the blade root 304 to the blade tip 306. As such, in an embodiment, the rotor blade(s) 302 may define the suction side 314 and the pressure side 312 as extending chordwise between the leading edge 316 and the trailing edge 318 and as extending spanwise between the root 304 and the tip 306.

In an embodiment, the rotor blade(s) 302 may also define a chordwise reference line 320 extending between the leading edge 316 and the trailing edge 318. The chordwise reference line 320 may be oriented parallel to a normal airflow 322 encountered by the rotor blade(s) 302 in operation. In an embodiment, the angle of the normal airflow 322 relative to the rotor blade(s) 302 may be computed for the nominal operating range of the wind turbine 100. For example, in an embodiment, the normal airflow 322 may be parallel to the axis of rotation (R) and the chord (C). In an additional embodiment, the rotational speed of the rotor 108 for the nominal operating range may result in a deviation of the normal airflow 322 from parallel to the axis of rotation (R) by less than 10 degrees. It should be appreciated that the chordwise reference line 320 may be computed and established for the nominal operating range of the rotor blade(s) 302 prior to the installation of the rotor blade(s) 302 on the wind turbine 100. It should further be appreciated that the rotational speed of the rotor 108 may vary from root 304 to tip 306 resulting in a variance in the angle of the normal airflow 322 and the corresponding chordwise reference line 320.

Figure 6:
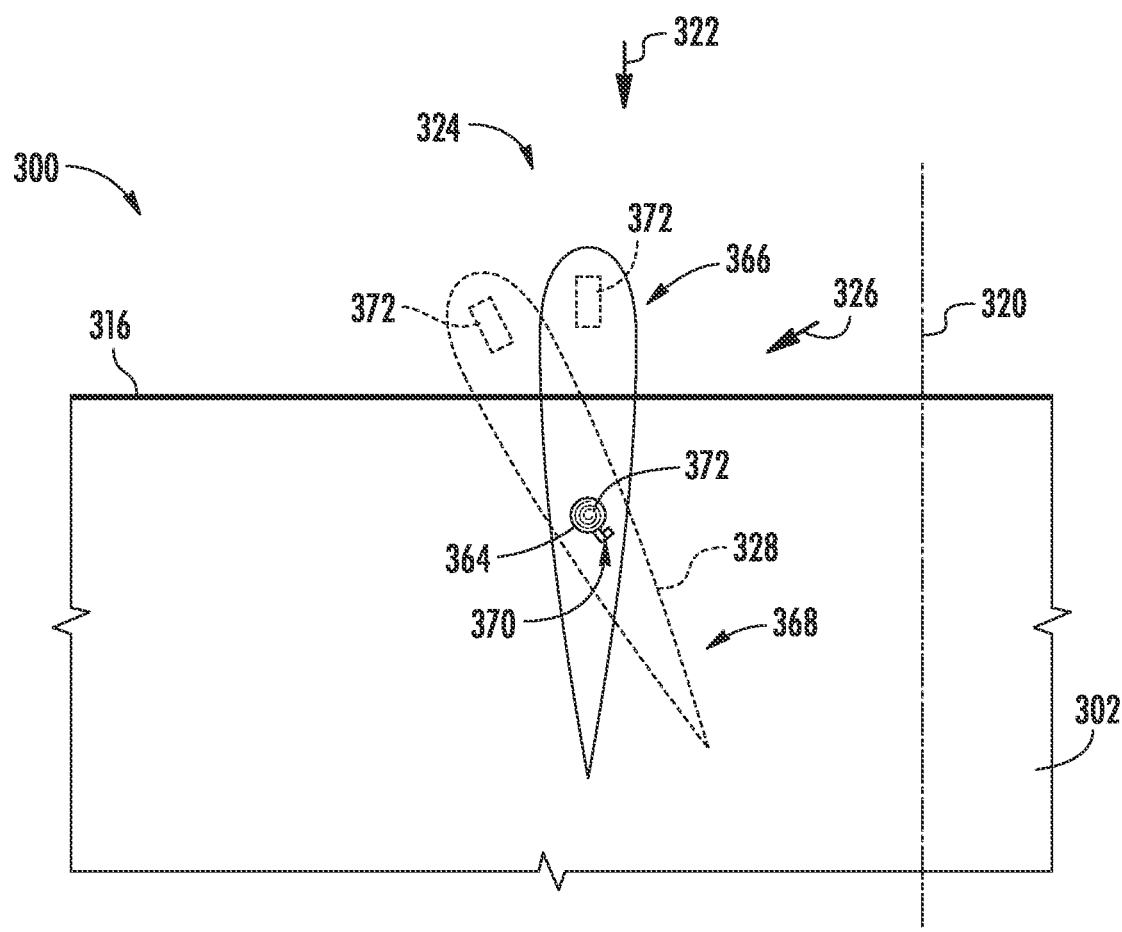
FIG. 6 illustrates a top view of yet another embodiment of a portion of rotor blade assembly according to the present disclosure, particularly illustrating a protrusion pivotably coupled to the rotor blade.

Referring still to FIG. 2, in an embodiment, the assembly 300 may include at least one protrusion 324. The protrusion(s) 324 may be secured at the leading edge 316 of the rotor blade(s) 302. In an embodiment, the protrusion(s) 324 may be a rectilinear member and/or aerodynamically tapered (as depicted in FIG. 6). Additionally, the protrusion(s) 324 may be symmetrical in at least one aspect and/or asymmetrical in at least one aspect.

In an embodiment, the protrusion(s) 324 may be configured to affect a crosswise airflow 326 when the rotor blade is in a stalled condition. The crosswise airflow 326 may include a chordwise component and a spanwise component and may intersect the chordwise reference line 320. For example, in an embodiment, the crosswise airflow 326 may generally flow from the root 304 toward the tip 306. It should be appreciated that affecting the crosswise airflow 326 may include the generation of vortices which may disrupt the vortex generation/shedding pattern resulting from the airflow across the rotor blade(s) 302 in a stalled condition and thus mitigate the resultant stall-induced vibrations.

Figure 3:
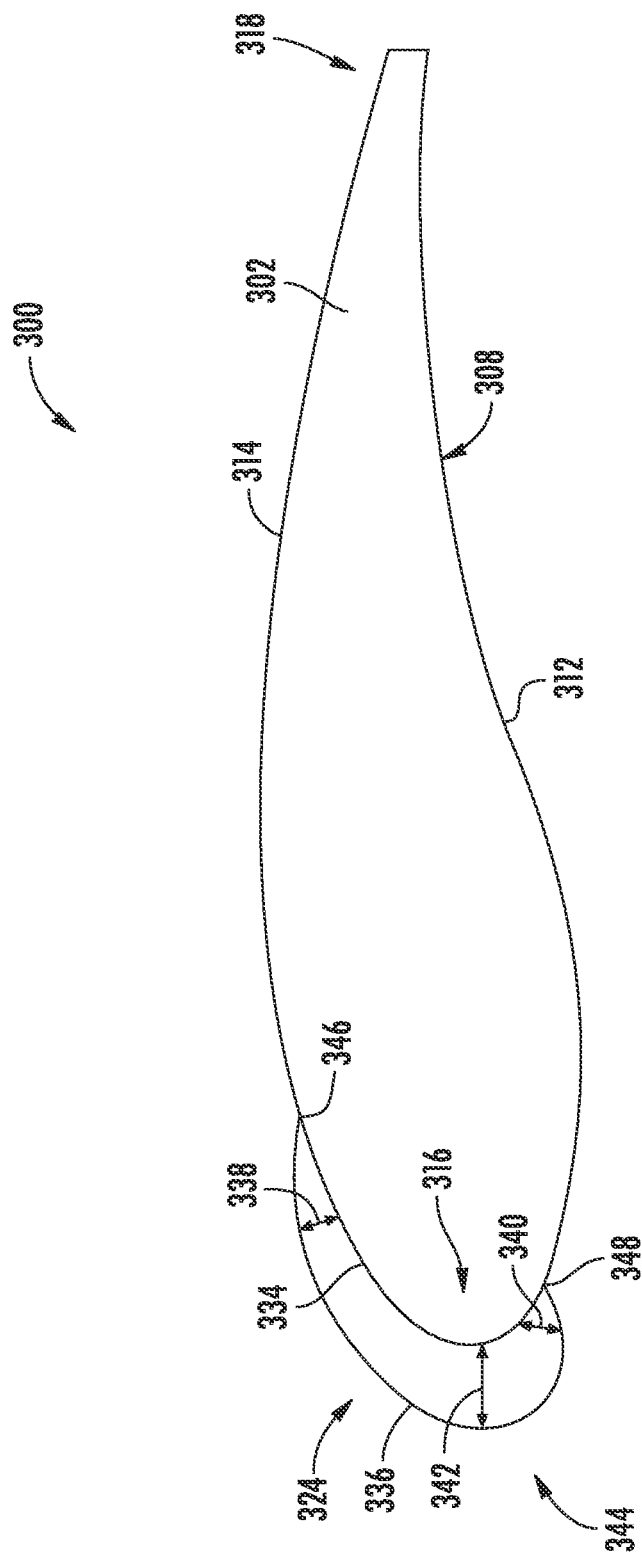
FIG. 3 illustrates a cross-sectional view of the rotor blade assembly of FIG. 2.
Figure 4:
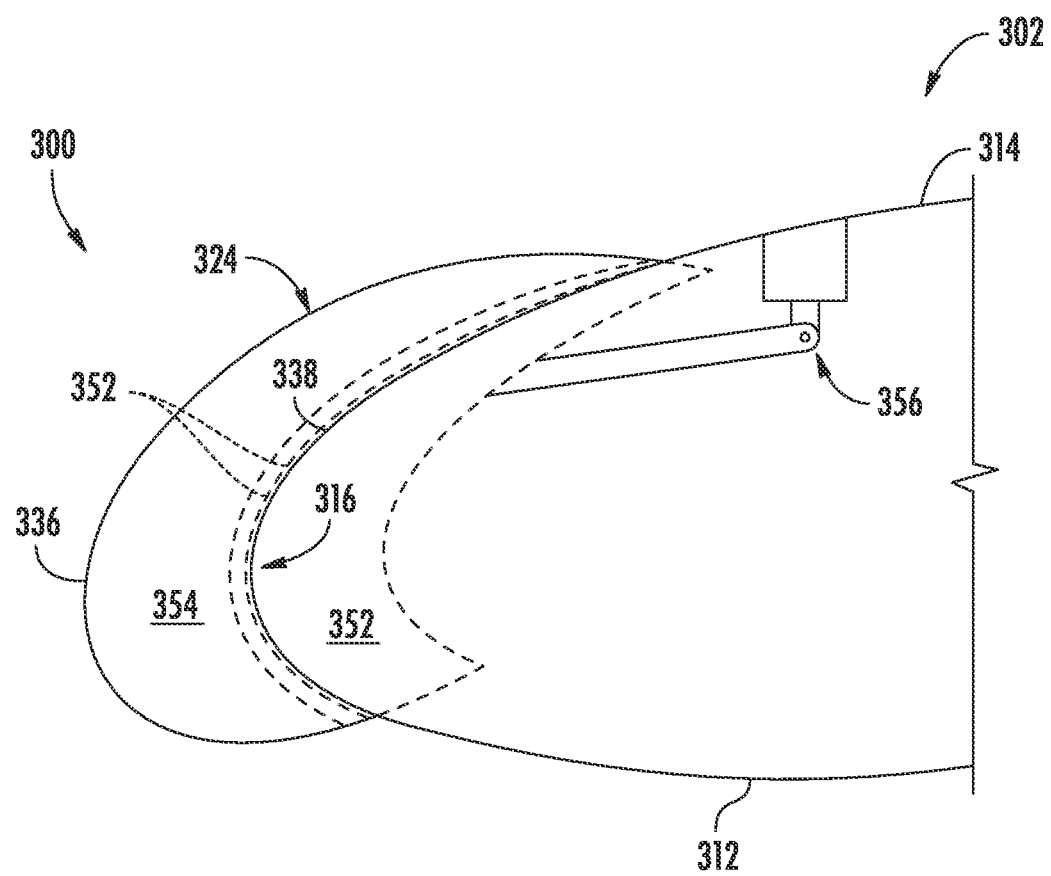
FIG. 4 illustrates an enlarged view of a portion of the cross-sectional view of the rotor blade assembly of FIG. 3.
Figure 5:
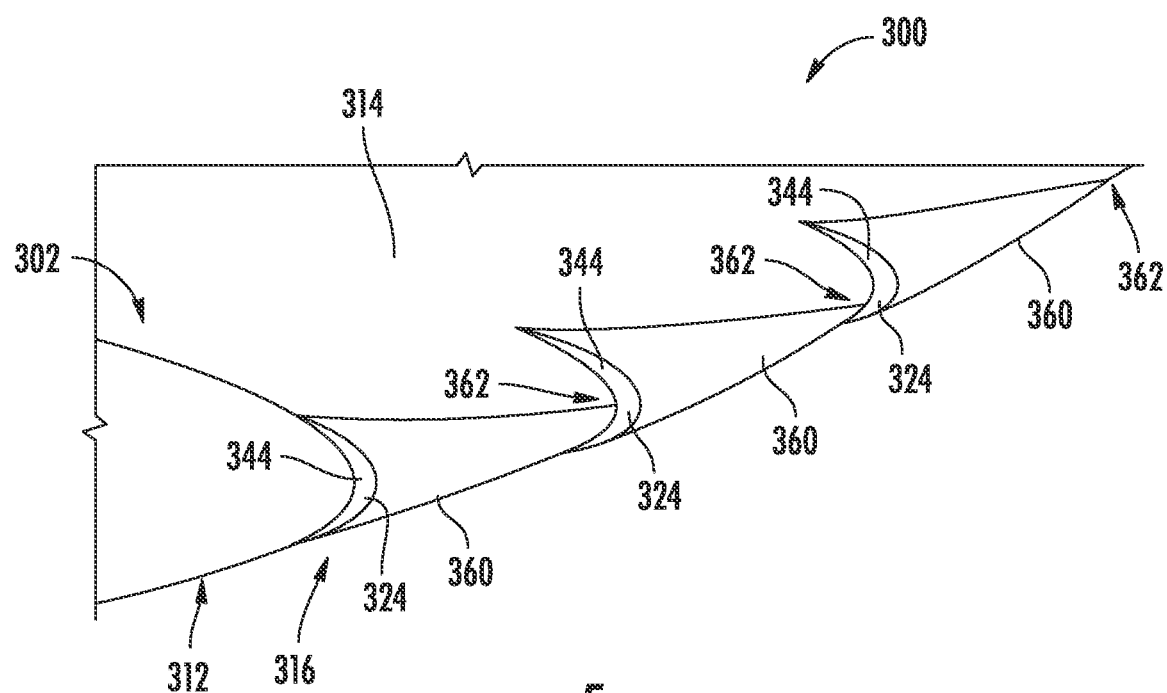
FIG. 5 illustrates a perspective view of another embodiment of a portion of a rotor blade assembly according to the present disclosure.

As is particularly depicted in FIGS. 3-5, in an embodiment, the protrusion(s) 324 may be secured at the leading edge 316 of the rotor blade 302 and define an extended leading edge. In an additional embodiment, the protrusion(s) 324 may be secured at the trailing edge 318 of the rotor blade 302 and define an extended trailing edge The protrusion(s) 324 may wrap around a portion of the rotor blade 302 from the suction side 314 to the pressure side 312. In other words, the protrusion(s) 324 may extend from the suction side 314 to the pressure side 312. In an embodiment, the protrusion(s) 324 may have a length along the suction side 314 of the rotor blade(s) 302 of 10% or more of the chord (C) to 40% or less of the chord (C) of the rotor blade(s) 302. In an embodiment, the protrusion(s) 324 may have a length along the pressure side 312 of the rotor blade(s) 302 of 5% or more of the chord (C) to 10% or less of the chord (C) of the rotor blade(s) 302.

In an embodiment, the protrusion(s) 324 may include a root-side face 328 and a tip-side face 330 disposed opposite thereof. The root-side face 328 may be oriented so as to face the root 304 of the rotor blade(s) 302. The tip-side face 330 may be oriented so as to face the tip 306 of the rotor blade(s) 302. The root-side face 328 may be impacted by the crosswise airflow 326 when the rotor blade(s) 302 is in a stalled condition. Accordingly, the root-side face 328 may be arranged at an angle 332 relative to the chordwise reference line 320. In other words, the root-side face 328 may be arranged at an angle to the normal airflow 322 when the wind turbine 100 is operating in a normal (non-stalled/non-feathered) operating state.

In an embodiment, the angle 332 may be greater than zero degrees with respect to the chordwise reference line 320. In other words, the angle 332 may reflect that the root-side face 328 may not be parallel to the normal airflow 322 when in operation. In an embodiment, the angle 332 may be less than or equal to 45 degrees with respect to the chordwise reference line 320. For example, the root-side face 328 may be oriented at an angle 332 to the chordwise reference line 320 which is at least three degrees and which is less than or equal to 40 degrees. In such an embodiment, the angle 332 may comprise an angle of attack relative to the normal airflow 322, which may be parallel to the chord (C) for the rotor blade(s) 302 in operation. In an additional embodiment, the angle 332 may be less than 20 degrees (e.g. five degrees) relative to the chordwise reference line 320.

It should be appreciated that an apparent width of the protrusion(s) 324 presented to the normal airflow 322 may increase with an increase in the angle 332. This increase in the apparent width may increase the aerodynamic drag of protrusion(s) 324 when the wind turbine 100 is operating. As it is generally desirable to limit the drag on the rotor blade(s) 302 when in operation, it may therefore be desirable to limit the apparent width of the protrusion(s) 324 by minimizing the angle 332. However, minimizing angle 332 may also reduce the effect of the protrusion(s) 324 on the crosswise airflow 326 by reducing an apparent length of the protrusion(s) 324 presented to the crosswise airflow 326. For example, the wake effect of the protrusion(s) 324 on the crosswise airflow 326 may be maximized when the apparent length of the protrusion(s) 324 coincides with the actual length of the protrusion(s) 324, while a vortex-generator effect may be maximized at an angle of 20 degrees to 30 degrees relative to the crosswise airflow 326. The apparent length of the protrusion(s) 324 may correspond to the actual length of the protrusion(s) 324 when the protrusion(s) 324 is oriented perpendicular to the crosswise airflow 326. As such, it should be appreciated that the establishment of the angle 332 by the installation of the protrusion(s) 324 may balance the minimization of drag with the effect of the protrusion(s) 324 on the crosswise airflow 326 when the rotor blade(s) 302 is in a stalled condition.

Referring now particularly to FIG. 3, in an embodiment, the protrusion(s) 324 of the assembly 300 may have a first arcuate profile 334 and a second arcuate profile 336. The first arcuate profile 334 may correspond to a profile of the interface of the leading edge 316 with the pressure side 312 and the suction side 314. The second arcuate profile 336 may define a suction-side offset 338 adjacent to the suction side 314 of the rotor blade(s) 302. The second arcuate profile 336 may also define a pressure-side offset 340 adjacent the pressure-side 312 of the rotor blade(s) 302. Additionally, the second arcuate profile 336 may, in an embodiment, define an intermediate offset 342. In an embodiment, the intermediate offset 342 may be greater than the pressure-side offset 340 and the suction-side offset 338. The offsets 338, 340, 342 may define a distance between the second arcuate profile 336 and the surface of the rotor blade(s) 302, such as the body shall 308. For example, in an embodiment, the intermediate offset 342 may be at least 5% of the chord (C) of the rotor blade(s) 302 at the spanwise position of the protrusion(s) 324.

In an embodiment, the first arcuate profile 334 and the second arcuate profile 336 may define a protrusion profile 344 which generally has a crescent shape. In such an embodiment, the second arcuate profile 336 may extend between a suction-side point of intersection 346 and a pressure-side point of intersection 348. In an additional embodiment, the second arcuate profile 336 may terminate without intersecting the suction side 314 and/or the pressure side 312 of the rotor blade(s) 302. It should be appreciated that in such an embodiment, the protrusion profile 344 may retain the generally crescent shape without tapering to at least one point.

Referring again to FIGS. 1 and 2, in an embodiment, the protrusion(s) 324 may be one of a plurality of protrusions. In such an embodiment, a spacing (D) between each protrusion 324 of the plurality of protrusions may be at least 1.5 times the chord (C) of the rotor blade(s) 302. In a further embodiment, the spacing (D) between each protrusion 320 for the plurality of protrusions may be at least three times the chord (C) of the rotor blade(s) 302. In an embodiment, the chord (C) may be the average of the chords (C) at the spanwise position of each protrusion 324 of the plurality of protrusions. For example, in an embodiment, the plurality of protrusions may, as depicted in FIG. 1 include three protrusions 324. The plurality of protrusions may be distributed across a tip region 350 of the rotor blade(s) 302. The tip region 350 may include at least one quarter of the span (S) of the rotor blade(s) 302. It should be appreciated that the spacing (D) between each protrusion 324 may be selected to maximize the effect of the protrusions 324 on the crosswise airflow 326, and thereby the mitigation of the stall-induced vibrations, while minimizing the drag of the protrusions 324 on the rotor blade(s) 302 by employing a minimum number of protrusions 324.

Referring now to FIG. 4, in an embodiment, the protrusion(s) 324 of the assembly 300 may be movably coupled to the rotor blade(s) 302. The protrusion(s) 324 may have a retreated operating position 352 and a deployed operating position 354. The protrusion(s) 324 may be in the deployed operating position 354 when the rotor blade(s) 302 is in a stalled condition. The retreated operating position 352 may be a normal operating position wherein the protrusion(s) 324 is at least partially retracted into a recess when the rotor blade(s) 302 is in a non-stalled condition. For example, in an embodiment, when in the retreated operating position 352 the protrusion(s) 324 may be at least partially retracted into or folded onto the body shell 308. In an embodiment, the retreated operating position 352 may include positioning the protrusion(s) 324 so that the first arcuate profile 336 aerodynamically conforms substantially to the body shell 308.

In an embodiment, the assembly 300 may include an actuating mechanism 356 operably coupled to the protrusion(s) 324. The actuating mechanism 356 may be configured to transition the protrusion(s) 324 between the retreated operating position 352 and the deployed operating position 354. The actuating mechanism 356 may be an electrical system, a pneumatic system, a hydraulic system and/or a combination thereof. For example, in an embodiment, the actuating mechanism 356 may include an air scoop 358. The air scoop 358 may be configured to receive a portion of an airflow at an angle to the chordwise reference line 320 (e.g. the crosswise airflow 326). In response to receiving the portion of the airflow with the air scoop 358, the protrusion(s) 324 may be transitioned to the deployed operating position 354. In other words, the presence of the crosswise airflow 326 may trigger and/or drive the deployment of the protrusion(s) 324. For example, the portion of air received by the air scoop 358 may inflate a portion of the actuating mechanism 356 so as to deploy the protrusion(s) 324.

Referring now to FIG. 5, in an embodiment, the protrusion(s) 324 of the assembly 300 may include a profile extension 360. The profile extension 360 may extend in a spanwise direction from the protrusion profile 344. The profile extension 360 may taper in a spanwise direction. In an embodiment, the profile extension 360 may be coupled along the length of the second arcuate profile 336 and may taper from the second arcuate profile 336 to a line of intersection 362 with the leading edge 316. In an embodiment, the line of intersection 362 with the leading edge 316 may be positioned adjacent to an additional protrusion(s) 324 of a plurality of protrusions and the profile extension may extend between the protrusions 324.

In an embodiment, the profile extension 360 may include a plenum in fluid communication within airflow. In such an embodiment, an airflow, such as the crosswise airflow 326 may enter the plenum. In at least one embodiment, the plenum may be constructed of a flexible material, such as a composite, a plastic, a foil, and/or a fabric. Accordingly, the plenum defined by the profile extension 360 may be inflated by the crosswise airflow 326. It should be appreciated that the plenum may aerodynamically conform substantially to the leading edge 316 when not inflated by the crosswise airflow 326.

Referring now to FIG. 6, in an embodiment the protrusion(s) 324 of the assembly 300 may be pivotably coupled to the rotor blade(s) 302 via a pivot member 364. The protrusion(s) 324 may be configured to pivot between a normal operating position 366 and a stalled operating position 368. In such an embodiment, the protrusion(s) 324 may be in the normal operating position 366 when the rotor blade(s) 302 is in a non-stalled condition. Accordingly, the normal operating position 366 may be minimally deviated from parallel to the normal airflow 322. Such an orientation may be due to the effects of the normal airflow 322 on the protrusion(s) 324. In other words, the orientation may be due to a weathervane effect.

In an embodiment wherein the rotor blade(s) 302 is in a stalled condition, the protrusion(s) 324 may be oriented in the stalled operating position 368. In the stalled operating position 368, the protrusion(s) 324 may be oriented at the angle 332 relative to the crosswise reference line 320. Such an orientation may increase the angle at which the crosswise airflow 326 impacts the hub-side face 328 of the protrusion(s) 324, thereby increasing the impact of the protrusion(s) 324 on the crosswise airflow 326 when the rotor blade(s) 302 is in a stalled condition. Because the protrusion(s) 324 may pivot to the more aerodynamically advantageous normal operating position 366, the angle 332 may be greater than may be employed when the protrusion(s) 324 is fixedly coupled to the rotor blade(s) 302. In an embodiment, the onset of the vortex and wait generation from the protrusion(s) 324 may be delayed to a critical cross-flow angle range. In such an embodiment, the protrusion(s) 324 may be permitted to pivot to an angle not exceeding an angle of maximum effect, thereby increasing a mitigation impact on the stall-induced vibrations.

In an embodiment, the angle 332 of the stalled operating position 368 may be limited via a pivot stop 370 configured to restrict a swiveling of the protrusion(s) 324. In an embodiment, the pivot stop 370 may restrict the swiveling of the protrusion(s) 324 to an arc wherein the angle 332 is greater than zero degrees and less than or equal to 45 degrees. For example, in an embodiment, the pivot stop 370 may be configured to restrict the swiveling of the protrusion(s) 324 to an arc extending between 3 degrees and 20 degrees relative to the chordwise reference line 320.

Referring still to FIG. 6, in an embodiment, the assembly 300 may also include a motivating element 372 positioned to facilitate the transition of the protrusion(s) 324 between the normal operating position 366 and the stalled operating position 368. The motivating element 372 may, for example, be a spring, a weight, an elastomeric member, a servo and/or combination thereof. In an embodiment, the motivating element 372 may be a torsion spring co-located with the pivot member 364. In a further embodiment, the motivating element 372 may be a mass concentration, such as a weight or area increased density of the protrusion(s) 324, positioned forward of the leading edge 316. Such a mass concentration may facilitate the transition of the protrusion(s) 324 to the stalled operating position 368 in response to a gravitational pull in the absence of a centrifugal acceleration when the rotor blade(s) 302 is in the stalled condition.

Figure 7:
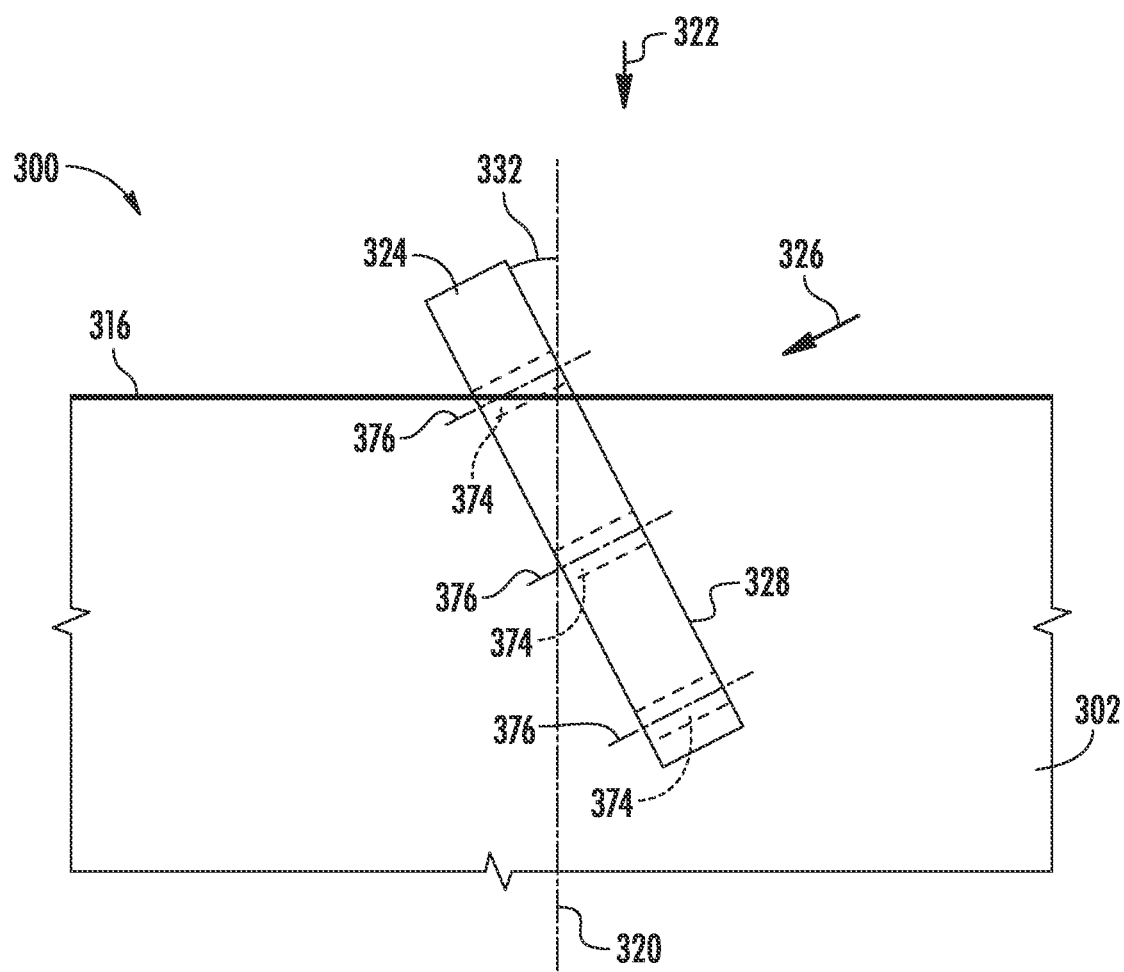
FIG. 7 illustrates a top view of still another embodiment of a portion of the rotor blade assembly according to the present disclosure, particularly illustrating a protrusion formed with a plurality of vortex perforations.

Referring now to FIG. 7, in an embodiment, the protrusion(s) 324 of the assembly 300 may include a plurality of vortex perforations 374. Each vortex perforation 374 may have a vortex-bore axis 376 which is oriented perpendicular to the root-side face 328. In such an embodiment, the plurality of vortex perforations 374 may generate a plurality of vortices in response to an airflow at an angle to the chordwise reference line 320 (e.g. the chordwise airflow 326). In other words, in an embodiment employing the plurality of vortex perforations 374, the chordwise airflow 326 may pass through at least a portion of the vortex perforations 374, which may result in an increased number of vortices relative to the number of vortices generated by the chordwise airflow 326 passing around the protrusion(s) 324.

Figure 8:
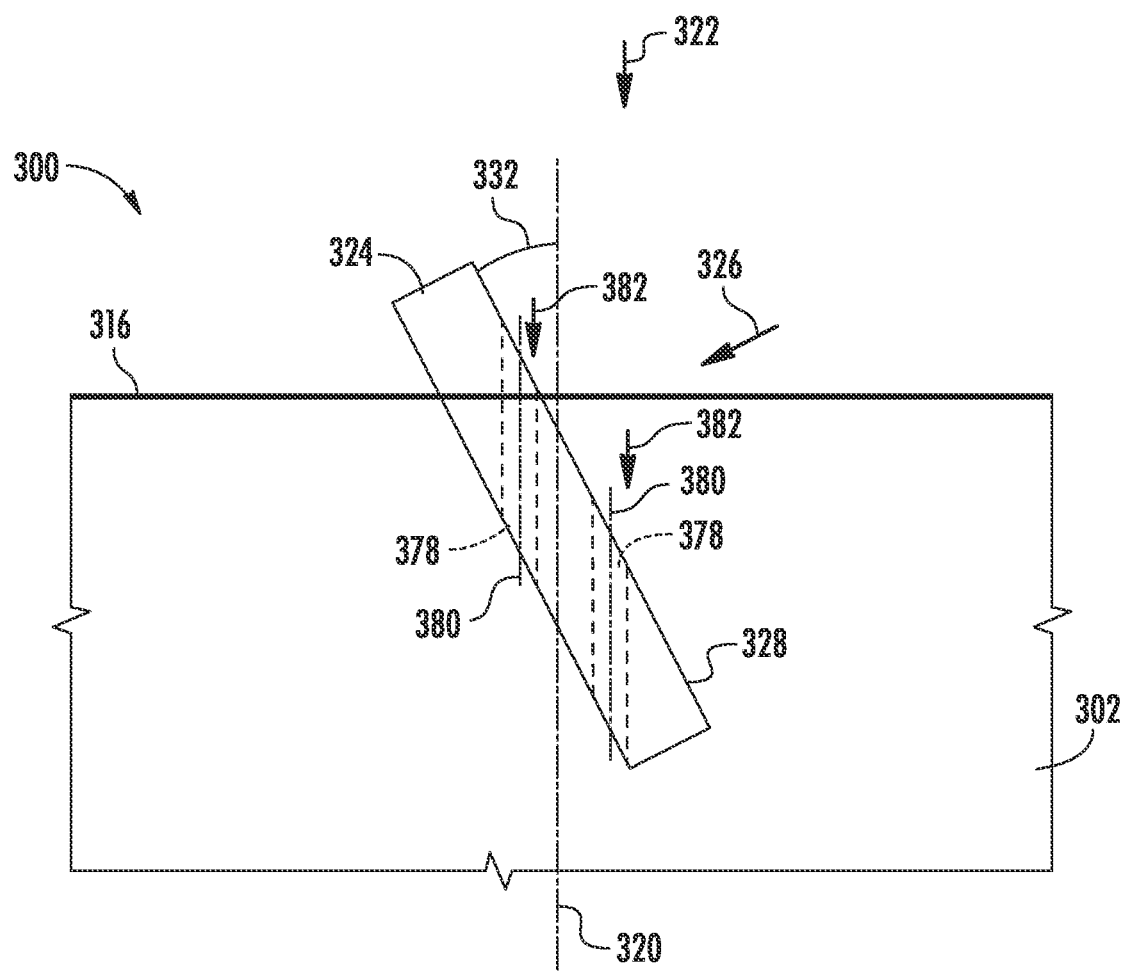
FIG. 8 illustrates a top view of a portion of yet another embodiment of a rotor blade assembly according to the present disclosure, particularly illustrating a protrusion formed with a plurality of passage perforations.

Referring now to FIG. 8, in an embodiment, the protrusion(s) 324 of the assembly 300 may include a plurality of passage perforations 378. Each passage perforation 378 may have a passage-bore axis 380 which is oriented parallel to the chordwise reference line 320. In such an embodiment, the plurality of passage perforations 378 may define a plurality of flow paths 382 for an airflow (e.g. the normal airflow 322) parallel to the chordwise reference line 320. It should be appreciated that the plurality of flow paths 382 may effectively reduce the cross-sectional area of the protrusion(s) 324 presented to the normal airflow 322, thereby decreasing the amount of drag produced by the protrusion(s) 324 relative to an embodiment wherein the protrusion(s) 324 lacks the plurality of passage perforations 378. It should further be appreciated that while the plurality of passage perforations 378 may reduce the effective cross-sectional area of the protrusion(s) 324 as seen by the normal airflow 322, the orientation of the passage perforations 378 may result in the protrusion(s) 324 appearing as a solid surface to the crosswise airflow 326.

Figure 9A:
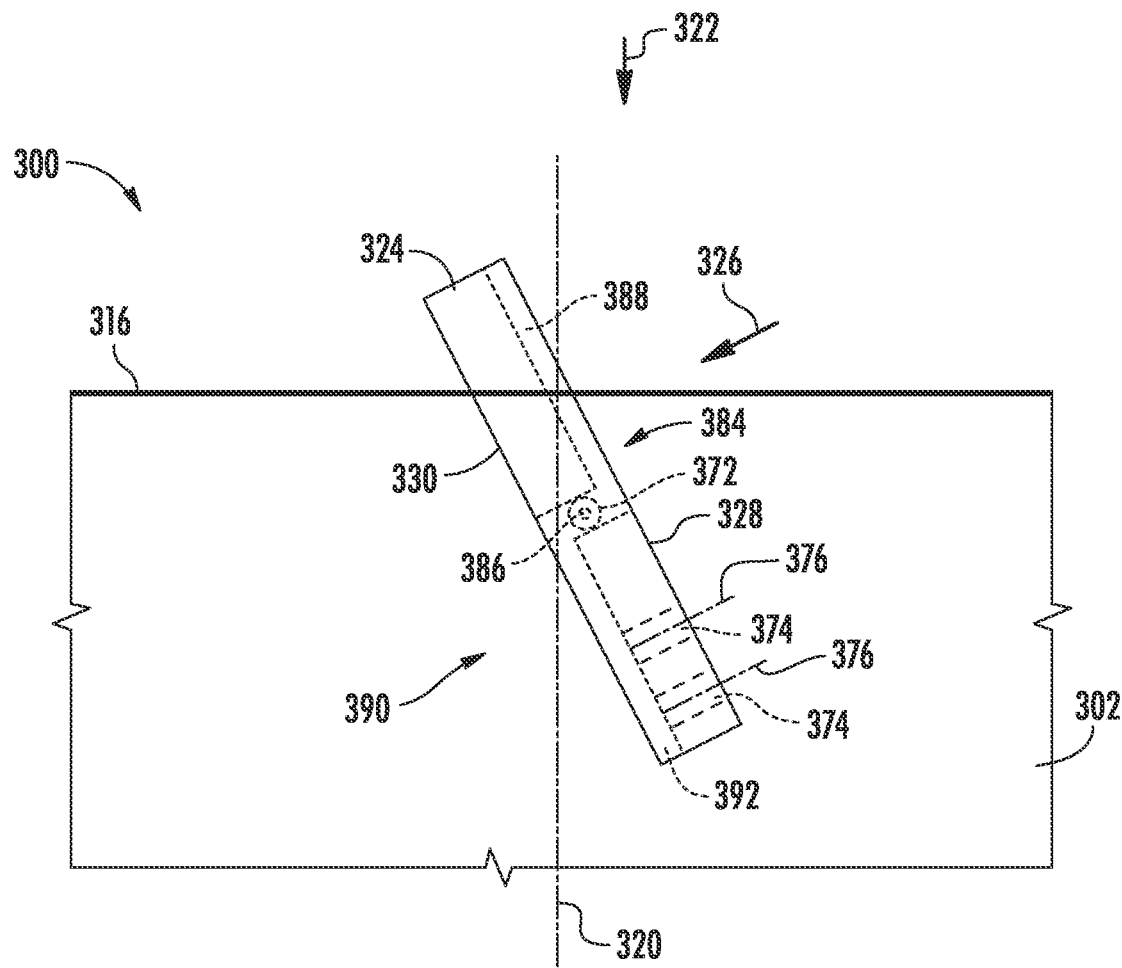
FIG. 9A illustrates a top view of another embodiment of a portion of a rotor blade assembly according to the present disclosure, particularly illustrating a flap element in a first flap position.
Figure 9B:
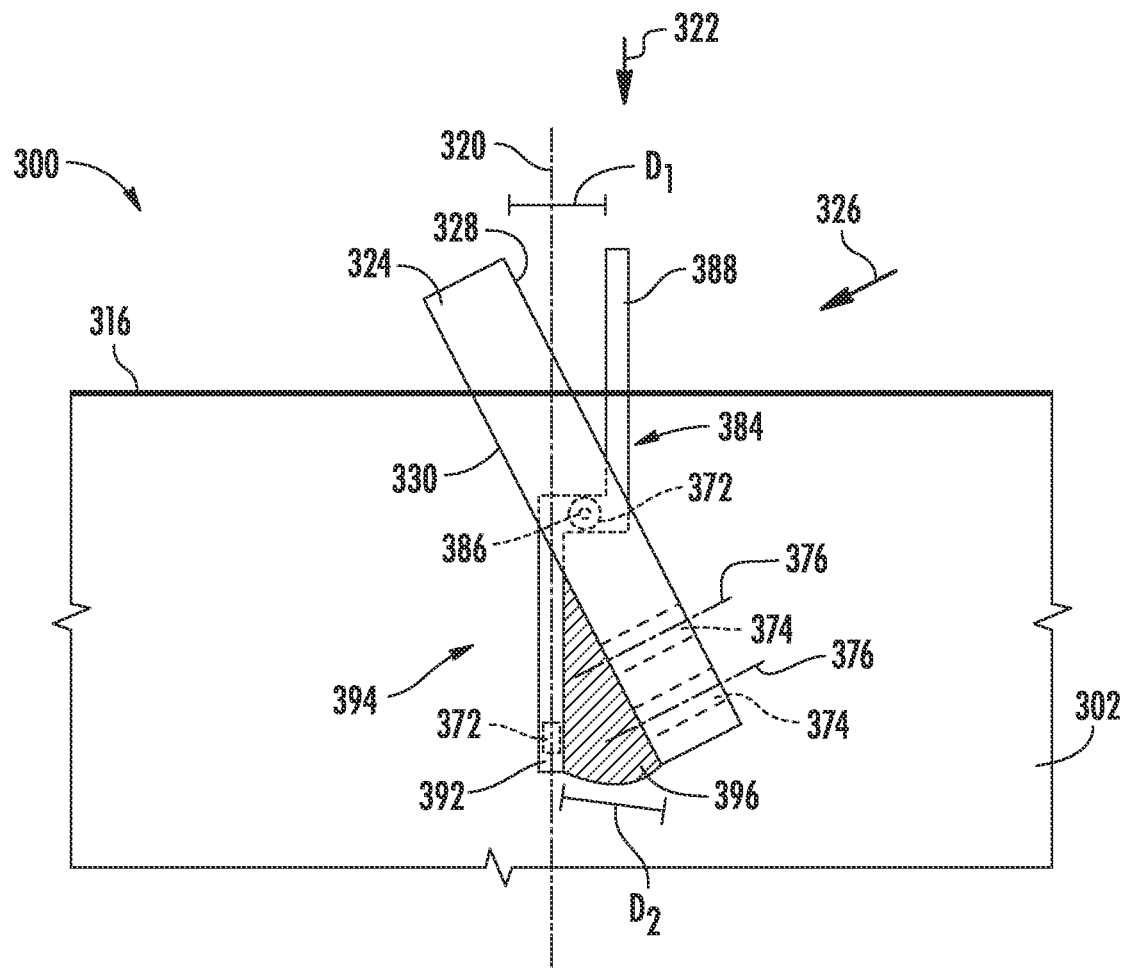
FIG. 9B illustrates a top view of the rotor blade assembly of FIG. 9A, particularly illustrating the flap element in a second flap position.

Referring now to FIGS. 9A and 9B, in an embodiment, protrusion(s) 324 of the assembly 300 may also include a flap element 384. The flap element 384 may be operably coupled to the protrusion(s) 324 via a pivot element 386. The flap element 384 may, in an embodiment, include a root-side flap portion 388 disposed within a recess of the root-side face 328 when the flap element 384 is in a first flap position 390 as depicted in FIG. 9A. In an embodiment, the flap element 384 may include a tip-side flap portion 392 disposed within a recess of the tip-side face 330 when the flap element 384 is in the first flap position 390. In an embodiment wherein the flap element 384 is in the first flap position 390, the flap element 384 may aerodynamically conform substantially to the root-side face 328 and the tip-side face 330. It should be appreciated that the flap element 384 may be in the first flap position 390 when the rotor blade(s) 302 is in a non-stalled condition thereby permitting the normal airflow 322 to apply a force to the flap element 384 which may facilitate the flap element 384 remaining in the first flap position 390.

As depicted in FIG. 9B, in an embodiment, the root-side flap portion 388 may have a second flap position 394. The second flap position 394 may be defined by a distance ($D_1$) between the root-side flap portion 388 and the root-side face 328 when the rotor blade(s) 302 is in a stalled condition. In an embodiment, the tip-side flap portion 392 may have a second flap position 394 defined by a distance ($D_2$) between the tip-side flap portion 392 and the tip-side face 330 when the rotor blade(s) 302 is in the stalled condition. It should be appreciated that the second flap position 394 may modify the shape of the protrusion(s) 324 seen by the crosswise airflow 326 and the angle at which the crosswise airflow 326 encounters the protrusion(s) 324 when the rotor blade(s) 302 is in the stalled condition.

Referring still to FIGS. 9A and 9B, in an embodiment, the flap element 384 may also include a motivating element 372 positioned to facilitate the transition of the flap element 384 between the first flap position 390 and the second flap position 394. The motivating element 372 may, for example, be a spring, a weight, an elastomeric member, a servo and/or combination thereof. In an embodiment, the motivating element 372 may be a torsion spring co-located with the pivot element 386. In a further embodiment, the motivating element 372 may be a mass concentration, such as a weight or area increased density of the flap element 384, positioned to the trailing-edge side of the pivot element 386. Such a mass concentration may facilitate the transition of the flap element 384 to the second flap position 394 in response to a gravitational pull when the rotor blade(s) 302 is in the stalled condition.

As is depicted in FIG. 9B, in an embodiment, the protrusion(s) 324 may be formed with the plurality of vortex perforations 374 as described herein. In such an embodiment, a plenum member 396 may be coupled between the tip-side face 330 of the protrusion(s) 324 and the tip-side flap portion 392. In at least one embodiment, the plenum member 396 may be constructed of a flexible material, such as a composite, a plastic, a foil, and/or a fabric. The plenum member 396 may be fluidly coupled to the plurality of vortex perforations 374 when the flap element 384 is in the second flap position 394. In such an embodiment, the plenum member 396 may slow and/or disrupt a portion of the crosswise airflow 326 entering the vortex perforations 374.

It should be appreciated that the slowing and/or disruption of the crosswise airflow 326 may serve to mitigate stall-induced vibrations.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered clauses:

Clause 1. A rotor blade assembly of a wind turbine, the rotor blade assembly comprising: a rotor blade defining a suction side and a pressure side extending chordwise between a leading edge and a trailing edge and spanwise between a root and a tip, the rotor blade also defining a chordwise reference line extending between the leading edge and the trailing edge; and at least one protrusion secured at the leading edge or the trailing edge of the rotor blade, the at least one protrusion extending from the suction side to the pressure side, the at least one protrusion having a root-side face and a tip-side face disposed opposite thereof, the root-side face being arranged at an angle relative to the chordwise reference line, the angle being greater than zero degrees and less than or equal to 45 degrees with respect to the chordwise reference line. Preferably, the at least one protrusion is secured to the leading edge and defines an extended leading edge.

Clause 2. The rotor blade assembly of clause 1, wherein the at least one protrusion has a first arcuate profile and a second arcuate profile, the second arcuate profile defining a suction-side offset adjacent the suction side of the rotor blade, a pressure-side offset adjacent the pressure side of the rotor blade, and an intermediate offset, the intermediate offset being greater than the pressure-side and suction-side offsets, wherein the offsets define a distance between the second arcuate profile and the surface of the rotor blade, wherein the first and second arcuate profiles define a protrusion profile which has a crescent shape.

Clause 3. The rotor blade assembly of any preceding clause, wherein the intermediate offset is at least 5% of the chord of the rotor blade at a position of the at least one protrusion.

Clause 4. The rotor blade assembly of any preceding clause, wherein the at least one protrusion is one of a plurality of protrusions, wherein a spacing between each protrusion of the plurality of protrusions is at least 1.5 times a chord length of the rotor blade.

Clause 5. The rotor blade assembly of any preceding clause, wherein the plurality of protrusions are distributed across a tip region of the rotor blade.

Clause 6. The rotor blade assembly of any preceding clause, wherein a spacing between each of the plurality of protrusions is at least three times a chord length of the rotor blade.

Clause 7. The rotor blade assembly of any preceding clause, wherein the at least one protrusion defines a protrusion profile, the at least one protrusion further comprising: a profile extension extending in a spanwise direction from the protrusion profile, the profile extension tapering in a spanwise direction.

Clause 8. The rotor blade assembly of any preceding clause, wherein the profile extension further comprises a plenum in fluid communication with an airflow.

Clause 9. The rotor blade assembly any preceding clause, wherein the at least one protrusion has a length along the suction side of the rotor blade of at least 10% or more of the chord, such as 10% or more of the chord to 40% or less of the chord of the rotor blade.

Clause 10. The rotor blade assembly of any preceding clause, wherein the at least one protrusion is movably coupled to the rotor blade, the at least one protrusion further comprising a retreated operating position and a deployed operating position, the rotor blade assembly further comprising: an actuating mechanism configured to transition the at least one protrusion between the retreated operating position and the deployed operating position.

Clause 11. The rotor blade assembly of any preceding clause, wherein the actuating mechanism comprises an air scoop configured to receive a portion of an airflow at an angle to the chordwise reference line, and wherein, in response to receiving the portion of the airflow, the at least one protrusion is transitioned to the deployed operating position.

Clause 12. The rotor blade assembly of any preceding clause, wherein the at least one protrusion is pivotably coupled to the rotor blade via a pivot member, the rotor blade assembly further comprising: a pivot stop configured to restrict a swiveling of the at least one protrusion.

Clause 13. The rotor blade assembly of any preceding clause wherein the at least one protrusion further comprises a motivating element positioned to facilitate the transition of the at least one protrusion between a normal operating position and a stalled operating position.

Clause 14. The rotor blade assembly of any preceding clause, wherein the at least one protrusion further comprises: a plurality of vortex perforations, each vortex perforation having a vortex-bore axis oriented perpendicular to the root-side face, wherein the plurality of vortex perforations generate a plurality of vortices in response to an airflow at an angle to the chordwise reference line.

Clause 15. The rotor blade assembly of any preceding clause, wherein the at least one protrusion further comprises: a plurality of passage perforations, each passage perforation of the plurality of passage perforations having a passage-bore axis oriented parallel to the chordwise reference line, the plurality of passage perforations defining a plurality of flow paths for an airflow parallel to the chordwise reference line.

Clause 16. The rotor blade assembly of any preceding clause, wherein the at least one protrusion further comprises: a flap element operably coupled thereto via a pivot element, the flap element comprising: a root-side flap portion disposed within a recess of the root-side face when the flap element is in a first flap position, the root-side flap having a second flap position defined by a distance between the root-side flap portion and the root-side face when the rotor blade is in a stalled condition, and a tip-side flap portion disposed within a recess of the tip-side face when the flap element is in the first flap position, the second flap position defining a separation to tip-side from the tip-side face of the tip-side flap portion when the rotor blade is in the stalled condition.

Clause 17. The rotor blade assembly of any preceding clause, wherein the flap element further comprises a motivating element positioned to facilitate a transition of the flap element between the first and second flap positions.

Clause 18. The rotor blade assembly of any preceding clause, wherein the at least one protrusion further comprises: a plurality of vortex perforations, each vortex perforation of the plurality of vortex perforations comprising a vortex-bore axis oriented perpendicular to the root-side face; and a plenum member coupled between the tip-side face of the at least one protrusion and the tip-side flap portion, the plenum member being fluidly coupled to the plurality of vortex perforations when the flap element is in the second flap position.

Clause 19. A wind turbine, comprising: a tower; a nacelle mounted atop the tower; and a rotor mounted to the nacelle, the rotor comprising a rotatable hub having a plurality of rotor blade assemblies secured thereto, each of the rotor blade assemblies comprising: a rotor blade defining a suction side and a pressure side extending chordwise between a leading edge and a trailing edge and spanwise between a root and a tip, the rotor blade further defining a chordwise reference line extending between the leading edge and the trailing edge; and a plurality of protrusions secured at the leading edge of the rotor blade, each protrusion of the plurality of protrusions extending from the suction side to the pressure side, wherein a spacing between each of the protrusions is at least 1.5 times a chord length of the rotor blade, each protrusion comprising: a root-side face and a tip-side face disposed opposite thereof, the root-side face being arranged at an angle relative to the chordwise reference line, the angle being greater than zero degrees and less than or equal to 45 degrees with respect to the chordwise reference line, a first arcuate profile, and a second arcuate profile, the second arcuate profile defining a suction-side offset adjacent the suction side of the rotor blade, a pressure-side offset adjacent the pressure side of the rotor blade, and an intermediate offset, the intermediate offset being greater than the pressure-side and suction-side offsets, wherein the offsets define a distance between the second arcuate profile and the surface of the rotor blade, wherein the first and second arcuate profiles define a protrusion profile which has a crescent shape.

Clause 20. The wind turbine of any preceding clause, wherein each of the protrusions is pivotably coupled to the rotor blade via a pivot member, each of the protrusions further comprising: a pivot stop configured to restrict a swiveling of the protrusion.

What is claimed is:
1. A rotor blade assembly of a wind turbine, the rotor blade assembly comprising:
  a rotor blade defining a body extending between a root and a tip and having surfaces defining a suction side, a pressure side, a leading edge, and a trailing edge, the rotor blade also defining a chordwise reference line extending between the leading edge and the trailing edge;

at least one protrusion secured at the leading edge or the trailing edge of the rotor blade and defining an extended leading or trailing edge, the at least one protrusion wrapping around a portion of the rotor blade from the suction side to the pressure side, the at least one protrusion having a root-side face and a tip-side face disposed opposite thereof, the root-side face being arranged at an angle relative to the chordwise reference line, the angle being greater than zero degrees and less than or equal to 45 degrees with respect to the chordwise reference line, wherein the at least one protrusion comprises:

a flap element operably coupled thereto via a pivot element, the flap element comprising:

a root side flap portion disposed within a recess of the root side face when the flap element is in a first flap position, the root side flap portion having a second flap position defined by a distance between the root side flap portion and the root side face when the rotor blade is in a stalled condition, and a tip side flap portion disposed within a recess of the tip side face when the flap element is in the first flap position, the second flap position being defined by a distance between the tip side flap portion and the tip side face when the rotor blade is in the stalled condition.

2. The rotor blade assembly of claim 1, wherein the at least one protrusion has a first arcuate profile and a second arcuate profile, the second arcuate profile defining a suction-side offset adjacent the suction side of the rotor blade, a pressure-side offset adjacent the pressure side of the rotor blade, and an intermediate offset, the intermediate offset being is greater than the pressure-side and suction-side offsets, wherein the offsets define a distance between the second arcuate profile and the surface of the rotor blade, wherein the first and second arcuate profiles define a protrusion profile which has a crescent shape.

3. The rotor blade assembly of claim 1, wherein the intermediate offset is at least 5% of a chord of the rotor blade, the chord being the chord of the rotor blade at a spanwise mounting position of the at least one protrusion.

4. The rotor blade assembly of claim 1, wherein the at least one protrusion is one of a plurality of protrusions, wherein the plurality of protrusions are distributed across a tip region of the rotor blade.

5. The rotor blade assembly of claim 1, wherein the at least one protrusion is one of a plurality of protrusions, wherein the spacing between each protrusion of the plurality of protrusions is at least three times a chord length of the rotor blade.

6. The rotor blade assembly of claim 1, wherein the at least one protrusion defines a protrusion profile, the at least one protrusion further comprising:

a profile extension extending in a spanwise direction from the protrusion profile, the profile extension tapering in a spanwise direction.

7. The rotor blade assembly of claim 6, wherein the profile extension further comprises a plenum in fluid communication with an airflow.

8. The rotor blade assembly of claim 1, wherein the at least one protrusion has a length along the suction side of the rotor blade of 10% or more of a chord to 40% or less of the chord of the rotor blade.

9. The rotor blade assembly of claim 1, wherein the at least one protrusion is movably coupled to the rotor blade, the at least one protrusion having a retreated operating position and a deployed operating position, the rotor blade assembly further comprising:

an actuating mechanism configured to transition the at least one protrusion between the retreated operating position and the deployed operating position.

10. The rotor blade assembly of claim 9, wherein the actuating mechanism comprises an air scoop configured to receive a portion of an airflow at an angle to the chordwise reference line, and wherein, in response to receiving the portion of the airflow, the at least one protrusion is transitioned to the deployed operating position.

11. The rotor blade assembly of claim 1, wherein the at least one protrusion is pivotably coupled to the rotor blade via a pivot member, the rotor blade assembly further comprising:

a pivot stop configured to restrict a swiveling of the at least one protrusion.

12. The rotor blade assembly of claim 11, further comprising:

a motivating element positioned to facilitate the transition of the at least one protrusion between a normal operating position and a stalled operating position.

13. The rotor blade assembly of claim 1, wherein the at least one protrusion further comprises:

a plurality of vortex perforations, each of the plurality of vortex perforations having a vortex-bore axis oriented perpendicular to the root-side face, wherein the plurality of vortex perforations generate a plurality of vortices in response to an airflow at an angle to the chordwise reference line.

14. The rotor blade assembly of claim 1, wherein the at least one protrusion further comprises:

a plurality of passage perforations, each of the plurality of passage perforations having a passage-bore axis oriented parallel to the chordwise reference line, the plurality of passage perforations defining a plurality of flow paths for an airflow parallel to the chordwise reference line.

15. The rotor blade assembly of claim 1, wherein the flap element further comprises a motivating element positioned to facilitate a transition of the flap element between the first and second flap positions.

16. The rotor blade assembly of claim 1, wherein the at least one protrusion further comprises:

a plurality of vortex perforations, each vortex perforation of the plurality of vortex perforations comprising a vortex-bore axis oriented perpendicular to the root-side face; and a plenum member coupled between the tip-side face of the at least one protrusion and the tip-side flap portion, the plenum member being fluidly coupled to the plurality of vortex perforations when the flap element is in the second flap position.

17. A wind turbine, comprising:

a tower;

a nacelle mounted atop the tower; and a rotor mounted to the nacelle, the rotor comprising a rotatable hub having a plurality of rotor blade assemblies secured thereto, each of the rotor blade assemblies comprising:

a rotor blade defining a body extending between a root and a tip and having surfaces defining a suction side, a pressure side, a leading edge, and a trailing edge, the rotor blade also defining a chordwise reference line extending between the leading edge and the trailing edge; and at least one protrusion secured at the leading edge or the trailing edge of the rotor blade and defining an extended leading edge or trailing edge, the at least one protrusion wrapping around a portion of the rotor blade from the suction side to the pressure side, the at least one protrusion having a root-side face and a tip-side face disposed opposite thereof, the root-side face being arranged at an angle relative to the chordwise reference line, the angle being greater than zero degrees and less than or equal to 45 degrees with respect to the chordwise reference line, wherein the at least one protrusion comprises:

a flap element operably coupled thereto via a pivot element, the flap element comprising:

a root side flap portion disposed within a recess of the root side face when the flap element is in a first flap position, the root side flap portion having a second flap position defined by a distance between the root side flap portion and the root side face when the rotor blade is in a stalled condition, and a tip side flap portion disposed within a recess of the tip side face when the flap element is in the first flap position, the second flap position being defined by a distance between the tip side flap portion and the tip side face when the rotor blade is in the stalled condition.

18. The wind turbine of claim 17, wherein the at least one protrusion is pivotably coupled to the rotor blade via a pivot member, the at least one protrusion further comprising:

a pivot stop configured to restrict a swiveling of the at least one protrusion.

* * * * *